United States Patent
Tanaka et al.

(10) Patent No.: US 6,289,577 B1
(45) Date of Patent: Sep. 18, 2001

(54) METHOD OF MAKING A SWING ACTUATOR

(75) Inventors: Kenji Tanaka, Sagamihara; Ken Motoi, Ota, both of (JP)

(73) Assignee: Nippon Petrochemicals Company, Limited, Tokyo (JP)

(*) Notice: Subject to any disclaimer, the term of this patent is extended or adjusted under 35 U.S.C. 154(b) by 0 days.

(21) Appl. No.: 09/569,839

(22) Filed: May 12, 2000

Related U.S. Application Data

(62) Division of application No. 08/727,635, filed as application No. PCT/JP96/00588 on Mar. 8, 1996.

(30) Foreign Application Priority Data

Mar. 10, 1995 (JP) .................................................. 7-78391

(51) Int. Cl.[7] .................................................. G11B 5/41
(52) U.S. Cl. .................... 29/603.03; 29/523.1; 29/524
(58) Field of Search .......................... 29/603.03, 523, 29/524.1

(56) References Cited

U.S. PATENT DOCUMENTS

| | | |
|---|---|---|
| 1,473,503 | 11/1923 | Nalbantian . |
| 3,773,427 | 11/1973 | Lucey, Jr. . |
| 4,829,395 | 5/1989 | Coon et al. . |
| 4,870,525 | 9/1989 | Wong et al. . |
| 5,098,940 | 3/1992 | Brooks . |
| 5,109,310 | 4/1992 | Ohkjita et al. . |
| 5,109,723 | 5/1992 | Kato . |
| 5,122,703 | 6/1992 | Takahashi et al. . |
| 5,148,071 | 9/1992 | Takahashi . |
| 5,153,794 | 10/1992 | Hinlein . |
| 5,165,090 | 11/1992 | Takahashi et al. . |
| 5,168,184 | 12/1992 | Umehara et al. . |
| 5,168,185 | 12/1992 | Umehara et al. . |
| 5,185,683 | 2/1993 | Oberg et al. . |
| 5,268,410 | 12/1993 | Yamada et al. . |
| 5,305,169 | 4/1994 | Anderson et al. . |
| 5,382,851 | 1/1995 | Loubier . |
| 5,461,524 | 10/1995 | Jurgenson . |
| 5,528,091 | 6/1996 | Loubier et al. . |
| 5,621,590 | 4/1997 | Pace et al. . |
| 5,654,851 | 8/1997 | Tucker et al. . |
| 5,864,446 | 1/1999 | Endo et al. . |

FOREIGN PATENT DOCUMENTS

| | | |
|---|---|---|
| 0 569 593 A1 | 11/1993 | (EP) . |
| 61-143808 | 9/1986 | (JP) . |
| 63-136364 | 6/1988 | (JP) . |
| 64-99821 | 4/1989 | (JP) . |
| 2-117772 | 9/1990 | (JP) . |
| 4-49368 | 4/1992 | (JP) . |
| 5-135514 | 6/1993 | (JP) . |
| 5-198140 | 8/1993 | (JP) . |
| 05303855 | 11/1993 | (JP) . |
| 5-342776 | 12/1993 | (JP) . |
| 6-139725 | 5/1994 | (JP) . |
| 7-85635 | 3/1995 | (JP) . |

*Primary Examiner*—Carl E. Hall
(74) *Attorney, Agent, or Firm*—Hollander Law Firm, P.L.C.

(57) ABSTRACT

A joined metal-resin plate body having a metal plate (1, 12) and a resin plate (2, 13) joined together, in which an insert member having a through-hole therein is embedded in the resin plate. The insert member is in close contact with the resin of the resin plate in the outer periphery of the insert member except for the faces where the through-hole opens. The metal plate has a metallic joining member (4, 16) adhered thereto. The resin plate is joined to the metal plate with the aid of the joining member fitted in the through-hole. The insert member and the surrounding resin have elastic stresses ($F_3$, $F_4$), which give rise to a sufficient joining strength among the joining member, the insert member and the resin plate. The stress of the surrounding resin is due to elastic deformation. The amount ($V_2$–$V_3$) of the elastic deformation is smaller than the amount ($V_2$) of deformation of the insert member which can give rise to an elastic stress ($F_3$) of the insert member.

13 Claims, 7 Drawing Sheets

METHOD OF MAKING A SWING ACTUATOR

TECHNICAL FIELD

This is a divisional of application Ser. No. 08/727,635 filed Nov. 4, 1996 which is a 371 of PCT/JP96/00588 filed Mar. 8, 1996.

This invention relates to not only a joined metal-resin body in which a constant positional relationship between a resin plate and a metal plate joined thereto can be maintained with the aid of a joining member without causing play or backlash, but also a swing-type actuator made using therein said joined body, and it also relates to processes for producing them. The swing-type actuator is used, for example, in a magnetic, optical, or optomagnetic disk drive, wherein the joined metal-resin plate body can be used as a joined body made by joining a head arm with a head support spring for supporting the head of the disk drive.

BACKGROUND ART

FIGS. 10 and 11 are plan and side views, respectively, of a conventional actuator. As shown in these figures, this actuator has head suspensions (support springs) 23 each supporting a magnetic head 21 at one end thereof and fixing arms 25 each having the other end of the head suspension 23 fixed thereto, and is provided with a carriage 27 attached to a disk unit in such a way as to be turnable around a shaft hole 28. A moving coil 29 disposed in the magnetic circuit of the disk unit for giving a turning force to the carriage 27 according to the applied electric current is fixed to the carriage 27. The head suspensions 23 are fixed to the corresponding fixed arms 25 with the aid of fixing members 31, respectively. The fixing arms 25 are made of a metal such as aluminum, while the head suspensions 23 are made of stainless steel.

As shown in FIG. 12, each fixing member 31 has a cylindrical portion 33 thrusted through the through-holes of both the head suspension 23 and the fixing arm 25, and a collar 35 provided at one end thereof. The head suspension 23 is fixed to the fixing arm 25 by outwardly bending the end portion of the cylindrical portion 33 as shown in FIG. 12, or by pressing the inner wall of the cylindrical portion 33 toward the inner wall of the through-hole of the fixing arm 25 in the direction of the arrows as shown in FIG. 13. The collar 35 fixes the head suspension 23 toward the fixing arm 25.

In the foregoing conventional example, the head suspension 23, the fixing arm 25 and the cylindrical portion 33 are each made of a metal, and the diameter of the cylindrical portion 33 is only a little smaller than the diameter of the through-hole of the fixing arm 25. Accordingly, the head suspension 23 can be easily and strongly superposed on and joined to the fixing arm 25 even though the cylindrical portion 33 is pressed from the inner side thereof to deform the wall of the cylindrical portion 33 as shown in FIG. 13.

On the other hand, for example, U.S. Pat. No. 5,382,851 discloses an actuator wherein a read/write head is installed in an aperture of a metallic insert member of a flat plate form embedded in a resin arm molded by insert molding with the insert member being inserted into the resin arm. Only the end portion of this insert member, opposite to the head, is embedded in the arm.

In general, an injected molten resin is of course brought into contact with an insert member in the case of insert molding. Since, however, a resin generally exhibits no affinity for a metal, causes shrinkage at the time of solidification of the resin in a molten state and has other inconvenient properties, gaps will sometimes be formed between the insert member and the resin when the resulting molding is solidified. The gaps prevent close adhesion of the resin to the insert member to cause backlash or play of the insert member. Such backlash, in other words, relative positional deviation between the insert member and the resin, is usually slight. Depending on the characteristics required of an apparatus wherein such a molding is used, however, such backlash poses problems in some cases.

Among others, when only one end portion of the insert member is embedded in the resin as in the actuator of the above-mentioned U.S. Patent, the influences of the gaps are large because the gaps between the resin and the insert member are localized only in that one end portion. Such gaps may cause an error in the relative position of the head fixed in the insert member as against the arm. The accuracy of the position of the head is an important factor required of the actuator as a precision device.

Further, in the case of the above-mentioned U.S. Patent, the head is directly installed in the aperture of the insert member positioned at the tip of the resin arm. This involves a fear of making accurate read/write difficult because the contact pressure of the head to a disk is not constant.

Although it would also be possible to attach the head to the resin arm by utilizing a through-hole provided in the resin arm instead of using the insert member, direct joining of a metal to a resin does inevitably not attain an essentially strong bond unless an adhesive or the like is used therebetween.

In view of the foregoing problems of the prior art, an object of this invention is to enable joining between a metal plate and a resin plate with the aid of a fixing member to maintain a backlash-free accurate relative positional relationship between the metal plate and the resin plate. Another object of this invention is to provide a lightweight and high-precision swing-type actuator that does not cause any backlash between arms and head suspensions even when the arms are made of a resin. A further object of this invention is to enable the contact pressure of the head to a disk in a disk unit to be maintained constant.

DISCLOSURE OF THE INVENTION

In order to attain the foregoing objects, the joined metal-resin plate body of this invention is characterized by comprising a metal plate; a resin plate; an insert member having a through-hole, embedded in the resin plate, and brought into close contact with the resin of the resin plate in the periphery thereof except for the faces thereof where the through-hole opens; a metallic joining member fitted into the through-hole and adhered to the metal plate to join the resin plate and the metal plate in a superposed state; wherein the insert member and the surrounding resin have respective elastic stresses enough to give rise to sufficient bonding forces among the jointing member, the insert member and the resin plate, and the stress of the surrounding resin is one due to elastic deformation, the amount of which is smaller than the amount of deformation of the insert member which can give rise to the elastic stress of the insert member.

The swing-type actuator of this invention is characterized by further comprising swingably supported resin arms; and metal support springs (support arms) each having one end thereof joined to the resin arm and the other end having a head fixed thereto; wherein the joined body composed of the arm and the support spring constitutes the above joined metal-resin plate body. This actuator is usually provided with a coil for swinging the arms and a turnable carriage having the coil and the arms fixed thereto.

Further, the process for producing a joined metal-resin plate body of this invention is characterized by comprising the step of molding a resin plate by insert molding in such a way that an insert member having a through-hole therein is embedded in a resin with the outer periphery of the member being covered by the resin except for the faces thereof where the through-hole opens; the step of fitting a metallic joining member having a hollow portion therein and adhered to a metal plate, into the through-hole to superpose the resin plate on the metal plate; and the step of joining the joining member and the insert member with a sufficient bond strength by pressing the sidewall of the hollow portion to deform the joining member, the insert member and the resin plate in amounts of deformation enough to join the joining member and the insert member with a sufficient bond strength, enough to vanish gaps formed between the insert member and the surrounding resin during the insert molding and enough to be fallen within the ranges wherein the deformation of the surrounding resin does not exceed the limit of elastic deformation thereof, and then releasing the applied pressure to maintain a predetermined amount of elastic deformation of the surrounding resin even after the release of the applied pressure.

Still further, the process for producing a swing-type actuator of this invention by molding resin arms and joining support springs for supporting heads with the arms is characterized by using the above process for producing a joined metal-resin plate body in forming joined bodies by joining the arms to the support springs.

In every case, a thermotropic liquid crystal polymer composition containing 10 to 80 wt. % of fibrous fillers such as glass or carbon fibers is preferably used as the resin.

BEST MODES FOR CARRYING OUR THE INVENTION

Figure 1:
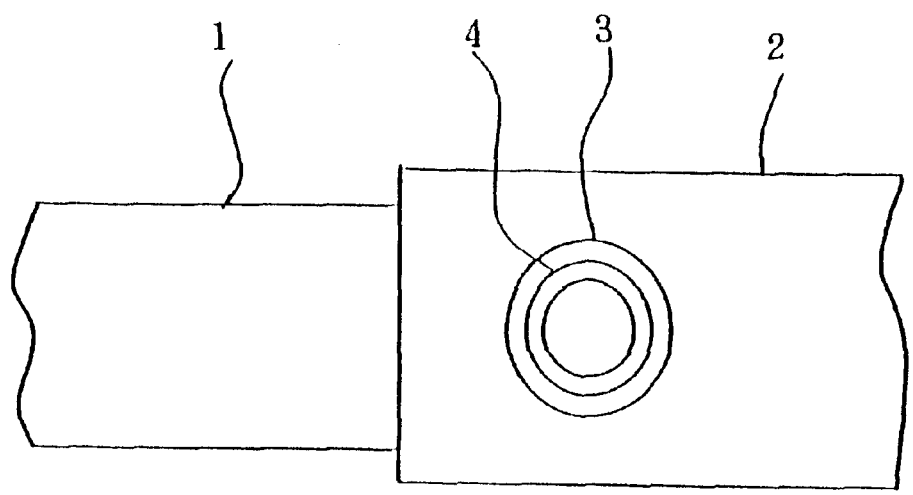
FIG. 1 is a plan view of a joined metal-resin plate body according to one embodiment of this invention.
Figure 2:
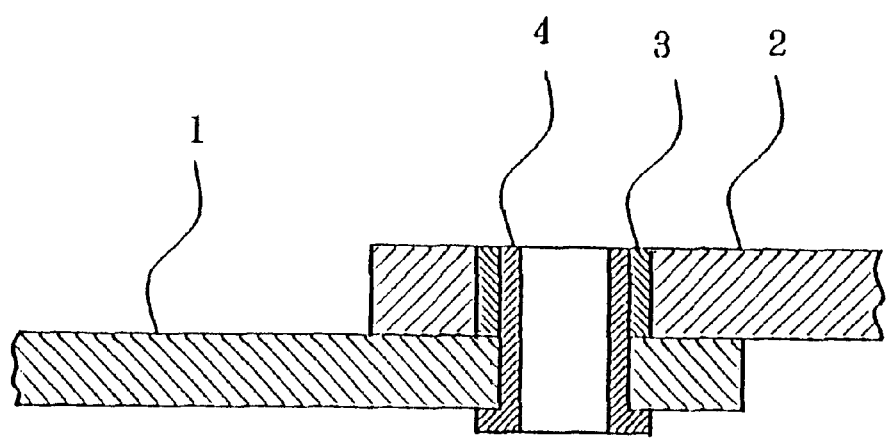
FIG. 2 is a cross-sectional view of the joined body of FIG. 1.

FIGS. 1 and 2 are plan and cross-sectional views, respectively, of a joined metal-resin plate body according to one embodiment of this invention. This body comprises a metal plate 1 and a resin plate 2 as shown in these figures. An insert member 3 having a through-hole is embedded in the resin plate 2. The outer periphery of the insert member 3 is in close contact with the resin of the resin plate 2 except for the faces thereof where the through-hole opens. The joined body is provided with a metallic joining member 4 fitted in the through-hole and adhered to the metal plate 1 to join the resin plate 2 with the metal plate 1 in a superposed state.

Where this joined body is applied to a swing-type actuator, the resin plate 2 and the metal plate 1 can be used as a resin arm and a support spring for supporting a head, respectively, because the arms are in the form of a flat plate.

The insert member 3 is embedded in a joint position between the metal plate 1 and the resin plate 2, by customary insert molding at the time of molding of the metal plate 1. The insert molding is effected so as to have the periphery of the insert member 3 substantially surrounded by the resin. This enables minute gaps formed between the resin of the resin plate 2 and the insert member 3 through solidification of the resin after the molding thereof to uniformly exist around the insert member 3 without localizing with respect thereto. Thus, the influences of the minute gaps are sometimes offset, and can therefore be expected to be decreased as a whole.

Figure 3:
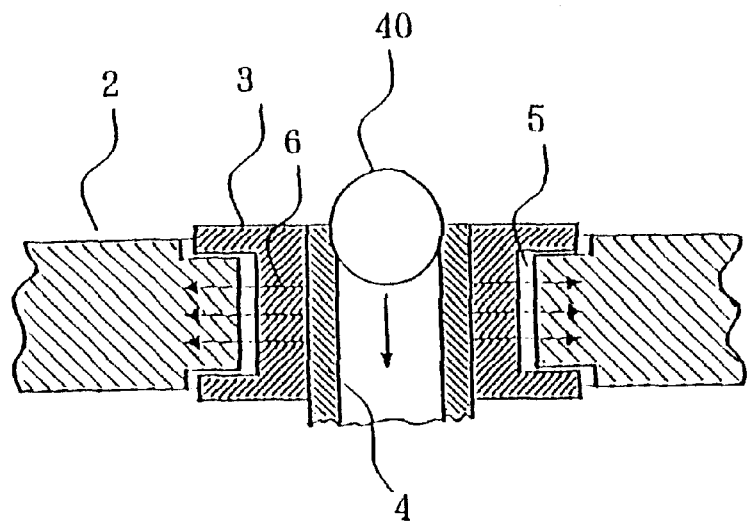
FIG. 3 is a cross-sectional view illustrating the state of deformation of an insert member and the resin of a resin plate in the joined body of FIG. 1.

The insert member 3 has substantially the same dimension in the direction of the through-hole as the thickness of the resin plate 2. The thickness dimension of the insert member 3 in the direction of the through-hole is made to be preferably a little larger than the thickness of the resin plate 2. More specifically, it is made to be larger by about 1 to about 50% of the thickness of the resin plate 2. Accordingly, the upper face alone, the lower face alone, or both the faces of the insert member 3 protrude a little from the plane(s) or face(s) of the resin plate 2 as shown in FIG. 3 which will be described later.

As for the insert molding of the resin plate 2 with the insert member 3 to be embedded therein, the insert member 3 is placed in a cavity of mold (not shown in the figures), and a resin to constitute the resin plate 2 is then injection-molded in the cavity to effect insert molding. In this case, if the insert member placed in the cavity is not fixed, there is a possibility that unfavorably the insert member may be moved or inclined by the injection pressure. In order to obviate this unfavorable possibility, it is preferred to provide a recess (dent, not shown in the figures) at a predetermined site inside the cavity where the insert member is to be placed, and to fit or adhesively fit the insert member into the recess to effect fixation thereof. In the case of a split mold cavity, such a recess is provided in one or both parts of the mold cavity. In other words, the insert member is fitted and fixed into the recess to lower the possibility of movement, inclination and the like thereof irrespective of the injection pressure and the like. When the foregoing measure is taken, the faces of the insert member 3 inserted into the resin plate inevitably protrude a little from the planes of the resin plate 2 correspondingly to the recess. Since the joining member 4 adhered to the metal plate 1 is fitted into the through-hole of the insert member 3, it follows that the insert member 3 and the joining member 4 have shapes suitable for mutual fitting thereof. Although they can take an arbitrary shape such as a cylinder or a square column, the cylindrical shape is preferable because it enables the pressure applied thereto to become uniform at every part thereof. Since the joining member 4 is made of metal, the adhesion of the metal plate 1 to the joining member 4 can be effected by soldering, beam welding or any other known metal-metal joining means.

In order to facilitate the deformation of the joining member 4 after being fitted into the insert member 3, it is preferable that each of the insert member 3 and the joining member 4 be made of a soft metal which may be soft steel, brass, copper, aluminum, or rolled steel.

The joining member 4 has a hollow portion or through-hole therein for use in deforming the member 4 and the insert member 3 after the fitting of the former into the latter.

Where the metal plate 1 is a support spring of the actuator, the metal plate 1 is made of an elastic metal which includes stainless steel or phosphor bronze. Where the joined body of this invention is applied to an actuator which gives access to a magnetic recording medium in a magnetic disk unit, an optical magnetic disk unit or the like, the metal plate 1 used is preferably a nonmagnetic one in order to avoid the magnetic interference.

Joining of the resin plate 2 with the metal plate 1 is carried out according to the following procedure. The joining member 4 adhered to the metal plate 1 is first fitted into the through-hole of the insert member 3 to superpose the resin plate 2 on the metal plate 1. Subsequently, the sidewall of the through-hole or hollow portion of the joining member 4 is pressed with such a pressure that the joining member 4 can be joined to the insert member 3 with a sufficient bond strength and the resulting deformation of the resin plate 2 does not exceed the limit of elastic deformation of the resin thereof. Thereafter, the applied pressure is released. Such pressing can be effected, for example, by inserting a spherical or tapered jig having a diameter larger than that of the through-hole or hollow portion of the joining member 4 into the through-hole or hollow portion thereof to apply thereto such a pressing pressure as to enlarge the diameter of the through-hole or hollow portion of the joining member 4. Further, this pressing may be carried out simultaneously with the fitting of the joining member 4 into the insert member 3.

Thus, when the sidewall of the through-hole or the hollow portion of the joining member 4 is deformed outward, the insert member 3 and the resin plate 2 are also deformed outward accordingly. The mode of such deformation may be, for example, dotted deformation at a large number of points or annular deformation. In either case, however, preferred is such a deformation as to enlarge the diameter of the hollow portion or through-hole uniformly along the direction parallel to the surface of the resin plate 2. As for this deformation, the joining member 4 and the insert member 3 are deformed until gaps between the insert member 3 and the resin plate 2 disappear, and thereafter the resin of the resin plate 2 adjoining the insert member 3 is also deformed. The deformation of the resin is effected within the limit of elasticity of the resin.

When the applied pressure is released, the deformation is a little recovered because of the elasticities of the joining member 4, the insert member 3 and the resin plate 2. Since the joining member 4 supports the insert member 3 and the resin plate 2 in such a way as to obviate further progress of the recovery of deformation, the joining member 4, the insert member 3 and the resin plate 2 are strongly joined to each other. This can attain a strong joining of the resin plate 2 and the metal plate 1 with the aid of the joining member 4 adhered to the metal plate 1.

Figure 4:
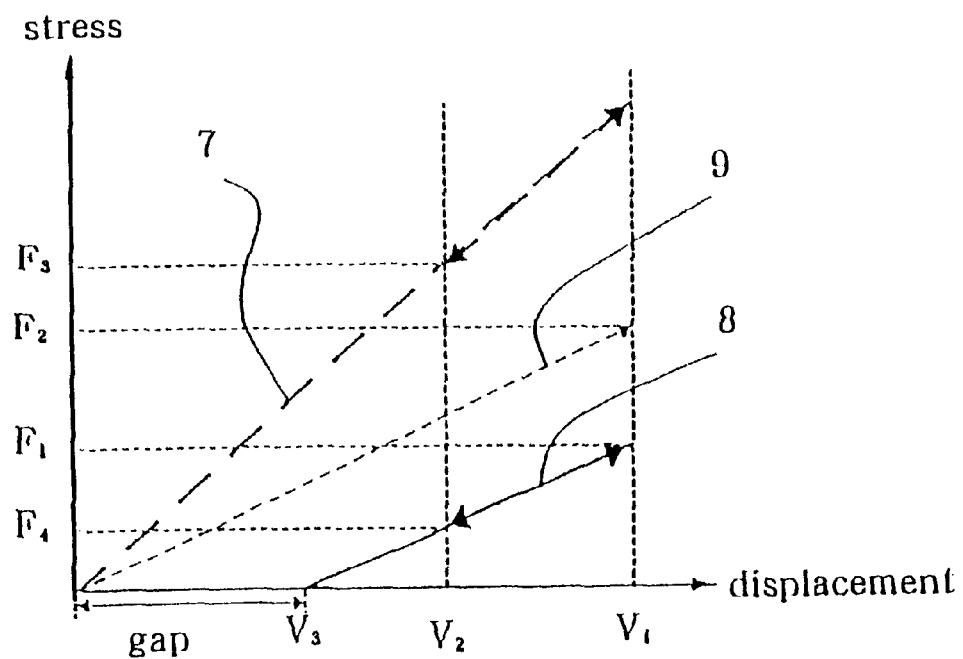
FIG. 4 is a graph showing the relationship between the displacement and the stress of each of the insert member and the resin at the time of deformation in FIG. 3.

The process of such deformation will be described in detail. FIG. 3 is a cross-sectional view illustrating the state of the above-mentioned deformation of the insert member 3 and the resin of the resin plate 2, while FIG. 4 is a graph showing the relationship between the displacement and the stress of each of the insert member 3 and the resin plate 2 at that time. In FIG. 3, numeral 5 refers to the above-mentioned gaps between the insert member 3 and the resin plate 2, numeral 6 to arrows showing the direction of the pressure applied to the insert member 3 with the aid of the joining member 4, and numeral 40 to an expansion jig for expanding the sidewall of the hollow portion of the joining member 4. In this case, FIG. 3 shows as a preferable mode an embodiment wherein the insert member 3 slightly protrudes from the planes of the resin plate 2. In FIG. 4, numeral 7 refers to a displacement-stress line of the insert member 3, and numeral 8 to a displacement-stress line of the resin.

When the above-mentioned expansion jig 40 is inserted into the joining member 4, the insert member 3 is deformed by a displacement $V_1$ as shown in FIG. 4. In other words, the stress in the insert member 3 is balanced at the point of displacement $V_1$. This displacement $V_1$ is a value enough to vanish the gaps 5. The disappearance of the gaps 5 can be confirmed, for example, by measuring a torque necessary for revolution of the metal plate 1 with respect to the resin plate 2. The revolution of the metal plate 1 by a lower torque indicates that the joining force is insufficient. When the jig is removed, the displacement is decreased to $V_2$. In other words, the stress in the insert member 3 is balanced at the point of displacement $V_2$.

The resin surrounding the insert member 3 begins to be displaced when the displacement of the insert member 3 reaches a displacement $V_3$ corresponding to the gaps S. When the displacement of the insert member 3 reaches $V_1$, the apparent displacement of the resin also reaches $V_1$, at the point of which the stress in the resin is balanced. Specifically, because of the gaps 5, the actual displacement of the resin is $V_1-V_3$, which is smaller than the displacement $V_1$ of the insert member 3. Accordingly, the stress $F_1$ corresponding to the displacement $V_1-V_3$ of the resin can be easily set within the limit of elasticity of the resin.

Figure 13:
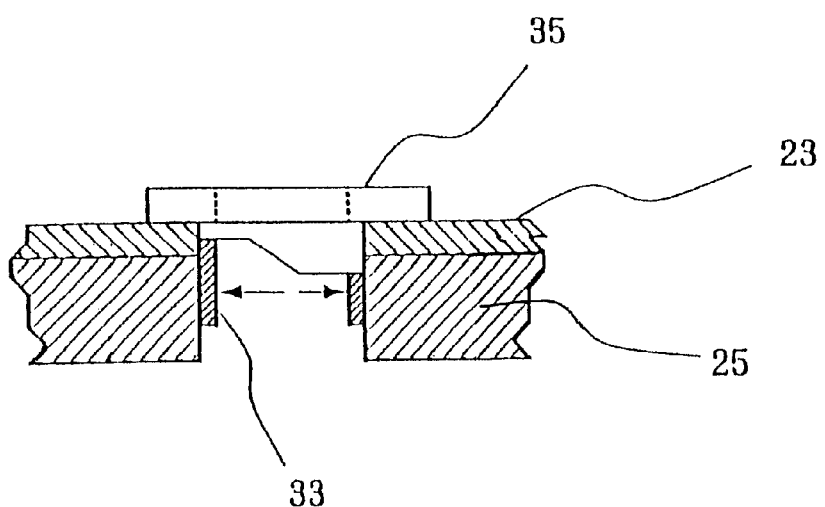
FIG. 13 is a cross-sectional view illustrating another example of a fixing member in the actuator of FIG. 10.

If the resin plate 2 is replaced by, for example, a metal arm necessitating no insert member and the metal arm is likewise displaced by $V_1$ to be joined to a fixing member without any insert member therebetween as shown in FIG. 13, the joint portion of the metal arm will exhibit changes in displacement and stress as shown by the broken line 9 in FIG. 4. Accordingly, if merely the resin plate 2 is substituted for the metal arm and joined to the fixing member without any insert member 3 therebetween in the conventional method as illustrated in FIG. 13, there will be a possibility of giving rise to a stress $F_2$ exceeding the limit of elasticity in the joint of the resin plate 2. In such a case, the resin material of the resin plate 2 undergoes plastic deformation thereby to fail to secure a strong joining. In this case, if the maximum stress $F_2$ exceeds the breaking strength of the resin material, there will be a possibility that the joint of the resin plate 2 may be broken and cracked.

Since the displacement $V_1$ is determined mainly in relation with the inner diameter of the joining member 4 and the expansion jig 40, the displacement is thought to be substantially the same for both cases.

When the expansion jig is removed, the displacement of the resin is decreased to the same point of displacement as the displacement $V_2$ of the insert member 3. More particularly, the actual displacement amounts to $V_2-V_3$ at which point the stress $F_4$ in the resin is balanced. In other words, after the removal of the expansion jig, the amount $(V_2-V_3)$ of elastic deformation of the resin is smaller than the amount $(V_2)$ of deformation of the insert member 3 which can give rise to an elastic stress $F_3$ of the insert member 3. Accordingly, the residual stress of the resin portion in the case where the gaps 5 exist before the expansion is smaller than that in the case where no gap 5 exists before the expansion, if the residual stress $F_3$ of the insert member 3 is the same for both cases. In the former case, therefore, any stress relaxation and creep of the resin portion can be easily avoided.

Accordingly, it is preferred that the amount of elastic deformation of the resin be set smaller than the amount of deformation of the insert member which can give rise to an elastic stress of the insert member.

Where the resin plate 2 is the arm of the actuator, injection molding of a thermoplastic resin may be used in the aforementioned insert molding. Injection molding can also be used in molding a carriage supporting arms. So-called engineering plastics having high strength and high rigidity are preferably used as the thermoplastic resin, and the preferable plastics include polyether-sulfones (PES), polyether-ether-ketones (PEEK), polyphenylene sulfides (PPS), and thermotropic liquid crystal polymers (e.g., thermotropic liquid crystal polyesters) each having a tensile modulus of elasticity of at least 100,000 $kg/cm^2$. The thermotropic liquid crystal polymers are especially preferable since they have excellent creep resistance, stress relaxation, etc., and high modulus of elasticity.

Figure 5:
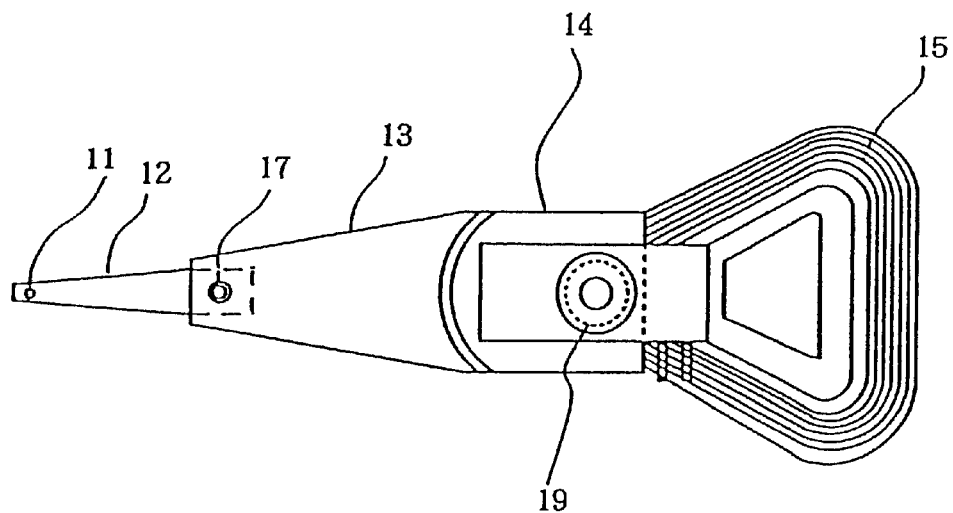
FIG. 5 is a plan view of a swing-type actuator according to another embodiment of this invention.
Figure 6:
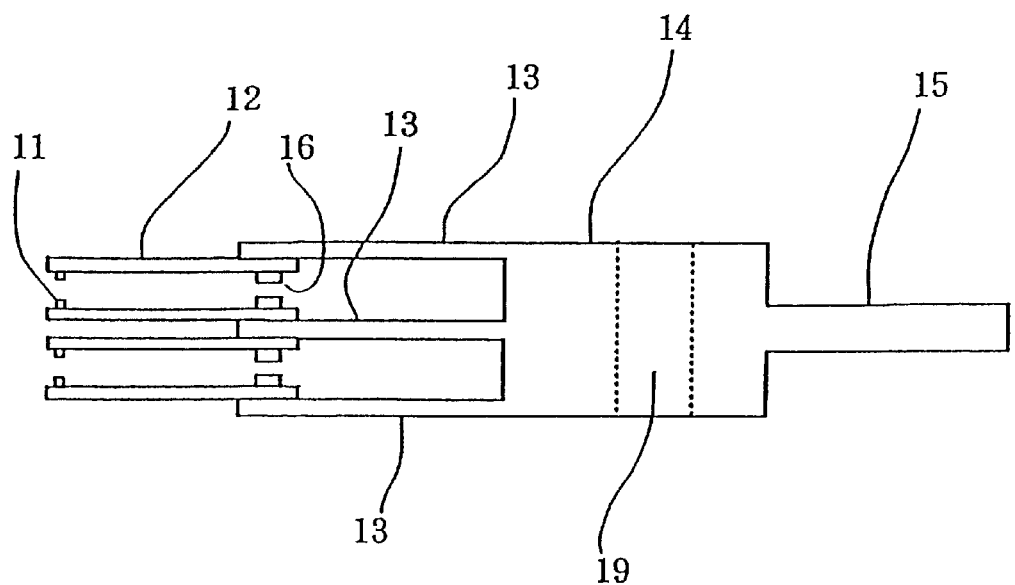
FIG. 6 is a side view of the actuator of FIG. 5.
Figure 7:
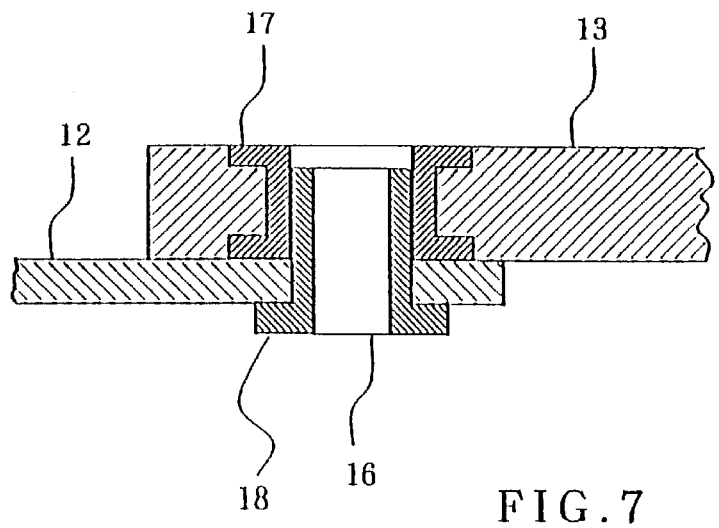
FIG. 7 is a cross-sectional view of a joint between a head suspension and a fixing arm in the actuator of FIG. 5.
Figure 8A:
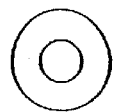
FIG. 8 is a diagram illustrating other modes of an insert member in the actuator of FIG. 5.
Figure 8B:
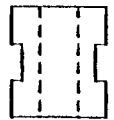
Figure 8C:
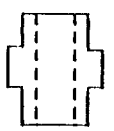
Figure 8D:
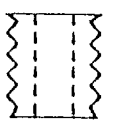

FIGS. 5 and 6 are plan and side views, respectively, of a swing-type actuator to which the joined body is applied and according to another embodiment of this invention, while FIG. 7 is a cross-sectional view of a joint between the head suspension and the fixing arm of this actuator. As shown in these figures, this actuator is provided with head suspensions (support springs) 12 each supporting a magnetic head 11 at one end thereof; fixing arms 13 each having the other end of the head suspension 12 fixed thereto; a carriage 14 supporting the fixing arms 13 and turnably attached to a disk unit; a moving coil 15 fixed to the carriage 14, disposed in the magnetic circuit of the disk unit and giving a turning force to the carriage 14 according to the applied electric current; and fixing members 16 each fixing the head suspension 12 to the fixing arm 13 through the through-holes of the suspension 12 and the arm 13. The fixing member 16 has a flange 18 at one end thereof.

The through-hole of each fixing arm 13 is provided in the insert member 17 embedded in the end portion of the arm 13 by insert molding. The number of the fixing arms 13 is three. One head suspension 12 is fixed to each of the two external (upper and lower) fixing arms, while two head suspensions 12 are respectively fixed to the upper and lower sides of the middle fixing arm. The carriage 14 is provided with a hole 19 for fitting a turning shaft thereinto.

The fixing arms 13 and the carriage 14 are made of a resin such as a thermotropic liquid crystal polymer, e.g., a thermotropic liquid crystal polyester, while the head suspensions 12 are made of, for example, stainless steel. The insert members 17 may be those made of aluminum or stainless steel. Herein, a wholly aromatic polyester as a thermotropic liquid crystal polyester which is a p-hydroxybenzoic acid/phthalic acid/dihydroxydiphenyl ternary copolyester (the resin itself being one that exhibits optical anisotropy when heat melted and is blended with glass fibers in an amount of 40% based on the whole composition) is used as the thermotropic liquid crystal resin of the fixing arms 13 and the carriage 14.

The fixing arms 13 and the carriage 14 are integrally and simultaneously formed by injection molding of the above-mentioned resin. In this case, injection molding is effected with each insert member 17 preliminarily disposed in an injection mold in such a way as to integrate the insert member 17 with the end portion of the fixing arm 13 of the carriage 14 while exposing, in the planes of the end portion of the fixing arm 13, the faces of the insert member where the through-hole thereof opens.

Each head suspension 12 is joined to the injection-molded fixing arm 13 and carriage 14 by first passing the fixing member 16 through the hole of the end portion of the head suspension 12, adhering the fixing member 16 to the head suspension 12 with solder or the like, then fitting the fixing member 16 into the through-hole of the insert member 17 to put the head suspension 12 and the fixing arm 13 one upon another, then pressing the sidewall of the through-hole of the fixing member 16 from the inside thereof with an expansion jig to deform the fixing member 16, the insert member 17 and the surrounding resin plate 13, and subsequently releasing the applied pressure. The amount of deformation caused by the applied pressure is that it is such enough to join the fixing member 16 to the insert member 17 with a sufficient strength, enough to vanish the gaps formed between the insert member 17 and the surrounding resin during insert molding, and to the extent that the deformation of the surrounding resin does not exceed the limit of elasticity thereof. The diameter of the expansion jig for securing the foregoing amount of deformation can be determined by finding a diameter providing the best results on a trial-and-error-basis.

FIG. 8 (a) is a plan view illustrating another mode of the insert member 17, and FIG. 8 (b) is a cross-sectional view thereof. FIGS. 8 (c) and (d) are cross-sectional views illustrating other modes of the insert member 17. When the outer periphery of the insert member is provided with a recess, a protrusion or notches as in these modes, the insert member 17 can be prevented from slipping out or moving.

Figure 9:
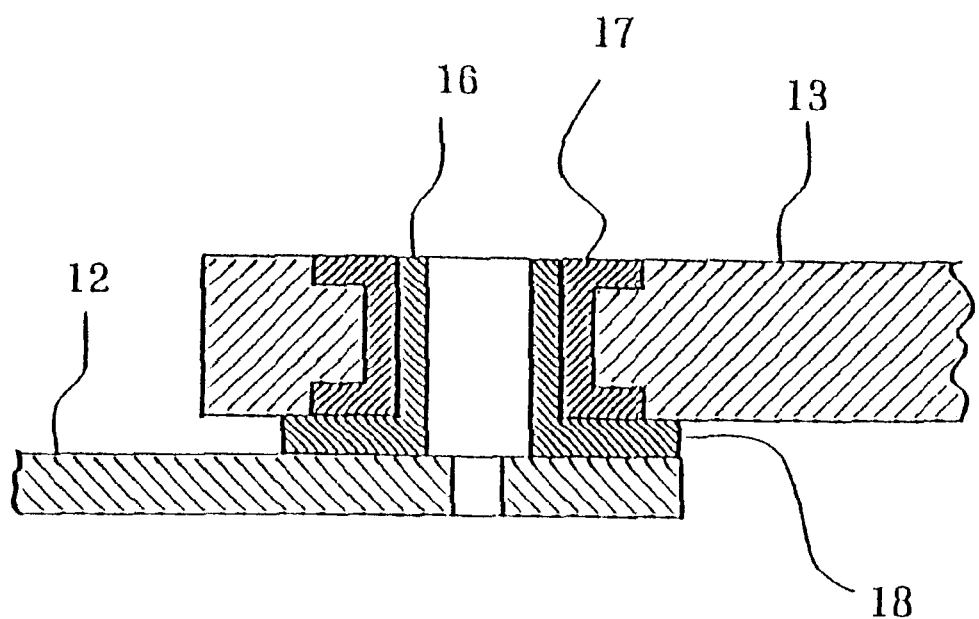
FIG. 9 is a cross-sectional view of a joint between a head suspension and a fixing arm in a swing-type actuator according to a further embodiment of this invention.
Figure 10:
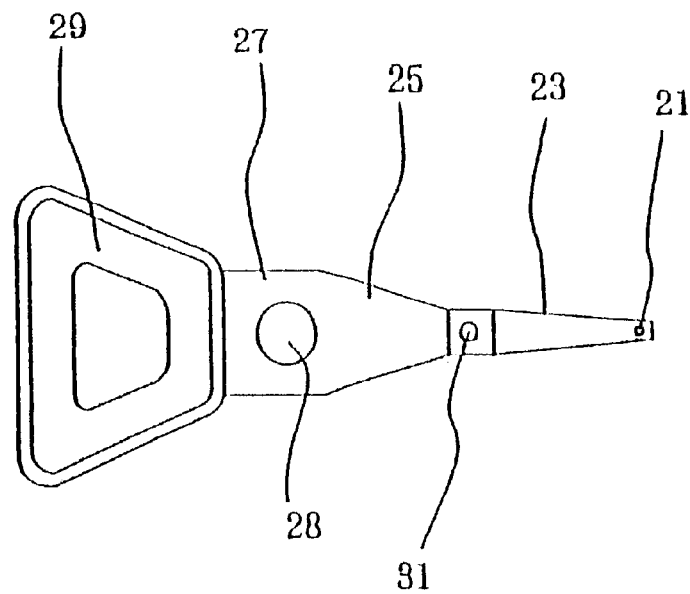
FIG. 10 is a plan view of a conventional actuator.
Figure 11:
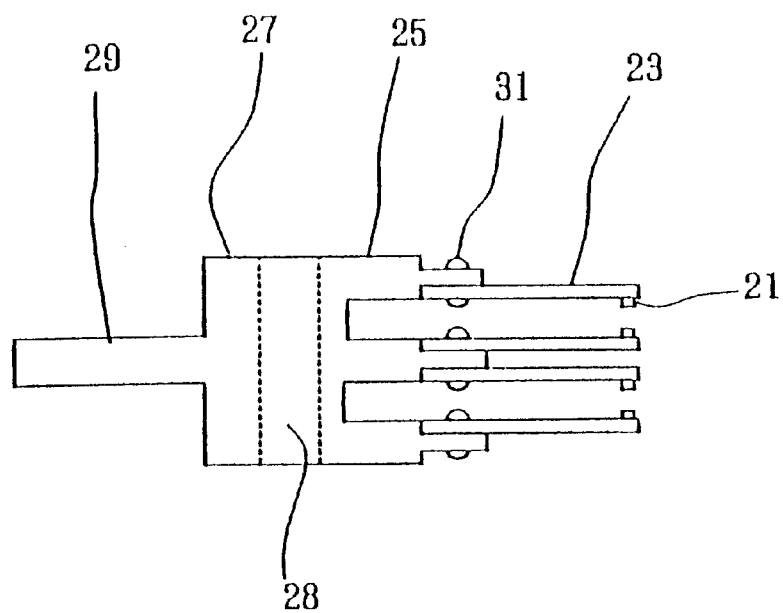
FIG. 11 is a side view of the actuator of FIG. 10.
Figure 12:
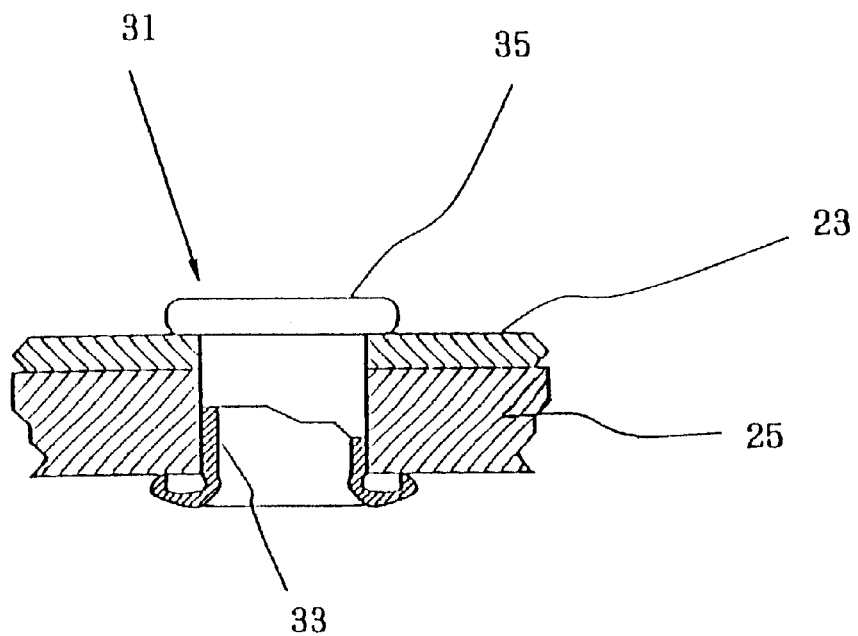
FIG. 12 is a cross-sectional view illustrating a fixing member in the actuator of FIG. 10.

FIG. 9 is a cross-sectional view of a joint between a head suspension 12 and a fixing arm 13 in a swing-type actuator according to a further embodiment of this invention. According to this embodiment, a fixing member 16 is attached to the head suspension 12 not by the passage through the hole of the suspension 12, but by the adhesion of the outer surface of the flange 18 thereof to the suspension 12. Since the head suspension 12 and the fixing member 16 are both made of a metal, a strong adhering means such as welding can be easily adopted. Accordingly, the head suspension 12 is joined to the fixing arm 13 with the flange 18 sandwiched in therebetween.

As described hereinbefore, since the joined metal-resin plate body of this invention has stresses existing in the insert member and the surrounding resin due to therein respective elasticities thereby to give rise to sufficient joining forces among the joining member, the insert member and the resin plate, and, further, since the stress of the resin is due to the elastic deformation thereof, the resin plate can be joined to the metal plate with a sufficient joining strength, while an accurate relative positional relationship can be sufficiently maintained between the resin plate and the metal plate. Furthermore, since the amount of elastic deformation of the resin is smaller than the amount of deformation of the insert member which can give rise to an elastic stress of the insert member, a favorable joining strength due to the elastic deformation of the resin can be easily brought out while facilitating the prevention of plastic deformation and breakage of the resin even when the joining member is deformed in such an amount as to secure a sufficient joining strength between the joining member and the insert member at the time of effecting the joining among the joining member, the insert member and the resin plate.

Accordingly, in the swing-type actuator of this invention, each resin arm can be joined to the support spring (head suspension) for supporting the head with a sufficient joining strength, while the relative positional relationship therebetween can be maintained with high accuracy. Accordingly, there can be provided a lightweight and high-precision swing-type actuator. Further, in a disk unit, the contact pressure of each head to a disk can be maintained constant.

Further, since a bonding force due to a residual stress between the metallic insert member and the metallic joining member is utilized directly, a strong joining force can be secured despite the joining between the resin plate and the metal plate. Furthermore, since the elastic recovery force of the resin can be utilized, such joining can further be strengthened. In this case, since the gap formed between the resin and the insert member during injection molding of the resin plate is positively utilized as a buffer region and the insert member also having the function of mitigating impact is used, a mechanical impact to the resin can be mitigated during joining by deformation of the joining member, whereby the resin plate is scarcely damaged.

What is claimed is:

1. A process for producing a joined metal-resin plate body comprising:

molding a resin plate by insert molding in such a way that an insert member having a through-hole therein is embedded in a resin with the outer periphery of the insert member being covered by said resin except for the faces thereof where said through-hole opens;

fitting a metallic joining member, which has a through-hole therein of substantially the same diameter throughout the hole, and wherein said metallic joining member is adhered to a metal plate, into said through-hole of the insert member to superpose said resin plate on said metal plate;

joining said metallic joining member with said insert member by applying pressure to the inner wall of said joining member to deform said joining member, said insert member and portion of said resin plate surrounding said insert member; wherein the amount of deformation is enough to join said joining member to said insert member and to eliminate gaps formed between said insert member and the surrounding resin during said insert molding, and wherein the deformation of said resin plate does not exceed the limit of elastic deformation of the resin; and subsequently releasing the applied pressure to maintain a predetermined amount of elastic deformation of said surrounding resin after the release of said applied pressure.

2. A process for producing a joined metal-resin plate body as claimed in claim 1, wherein the molding is effected after said insert member is fitted into a recess in a mold.

3. A process according to claim 1, wherein said resin plate includes resin arms and said metal plate includes metallic support springs for supporting heads, and further wherein said resin arms and said metallic support springs are joined in said joining step to create a swing actuator.

4. A process according to claim 1, wherein said through-hole of said joining member is cylindrical.

5. A process according to claim 1, wherein the resin plate is made of a thermotropic liquid crystal polymer containing fibrous filler.

6. A process according to claim 5, wherein the amount of said filler is from 10% to 80% by weight based on the weight of resin.

7. A process according to claim 1 wherein the metallic joining member is made of a soft metal selected from the group consisting of soft steel, brass, copper, aluminum and rolled steel.

8. A process according to claim 1 wherein said insert member is made of metal.

9. A process according to claim 8 wherein the metal is selected from the group consisting of soft steel, brass, copper, aluminum and rolled steel.

10. A process according to claim 1 wherein the pressure applied to the inner wall of said joining member is applied with a spherical or tapered jig.

11. A process according to claim 10, wherein the diameter of said spherical or tapered jig is larger than the diameter of said through-hole of the metallic joining member.

12. A process according to claim 1, wherein said metallic joining member is adhered to said metal plate by soldering or beam welding.

13. A process according to claim 2, wherein said resin plate includes resin arms and said metal plate includes metallic support springs for supporting heads, and further wherein said resin arms and said metallic support springs are joined in said joining step to create a swing actuator.

* * * * *